(12) United States Patent
Hanrahan et al.

(10) Patent No.: US 12,292,005 B2
(45) Date of Patent: May 6, 2025

(54) AIRCRAFT PROPULSION SYSTEM GEARTRAIN

(71) Applicant: Raytheon Technologies Corporation, Farmington, CT (US)

(72) Inventors: Paul R. Hanrahan, Sedona, AZ (US); Benjamin T. Mylrea, Jupiter, FL (US); David A. Stachowiak, Manchester, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/980,670

(22) Filed: Nov. 4, 2022

(65) Prior Publication Data

US 2024/0052786 A1    Feb. 15, 2024

Related U.S. Application Data

(60) Provisional application No. 63/397,641, filed on Aug. 12, 2022.

(51) Int. Cl.
*F02C 7/36* (2006.01)
*B64D 35/00* (2006.01)
*B64D 35/04* (2006.01)

(52) U.S. Cl.
CPC ............... *F02C 7/36* (2013.01); *B64D 35/00* (2013.01); *B64D 35/04* (2013.01); *F05D 2260/4031* (2013.01); *F05D 2260/902* (2013.01)

(58) Field of Classification Search
CPC .......... B64D 35/00; B64D 35/04; F02C 7/36; F05D 2260/4031
See application file for complete search history.

(56) References Cited

U.S. PATENT DOCUMENTS

| 4,651,521 A | 3/1987 | Ossi | |
|---|---|---|---|
| 4,964,844 A * | 10/1990 | Bagnall | F02C 7/36 475/330 |

(Continued)

FOREIGN PATENT DOCUMENTS

| CN | 107856488 A * | 3/2018 | ............... B60F 5/02 |
|---|---|---|---|
| DE | 102013215878 B3 * | 1/2015 | ............... F16H 1/46 |

(Continued)

OTHER PUBLICATIONS

EP Search Report for EP Patent Application No. 23208062.2 dated Apr. 5, 2024.

*Primary Examiner* — Topaz L. Elliott
(74) *Attorney, Agent, or Firm* — Getz Balich LLC

(57) ABSTRACT

An aircraft assembly includes a geartrain with a first gear system and a second gear system. The first gear system includes a first sun gear, a first ring gear, a plurality of first intermediate gears and a first carrier. The first sun gear and the first ring gear are each rotatable about an axis. The first intermediate gears are between and meshed with the first sun gear and the first ring gear. Each of the first intermediate gears is rotatably mounted to the first carrier. The second gear system is interconnected with the first gear system. The second gear system includes a second sun gear, a second ring gear, a plurality of second intermediate gears and a second carrier. The second intermediate gears are between and meshed with the second sun gear and the second ring gear. Each of the second intermediate gears is rotatably mounted to the second carrier.

17 Claims, 15 Drawing Sheets

(56) References Cited

U.S. PATENT DOCUMENTS

| | | | |
|---|---|---|---|
| 6,082,967 A | 7/2000 | Loisy | |
| 6,270,037 B1 | 8/2001 | Freese | |
| 8,591,362 B1* | 11/2013 | Liu | F16H 37/0806 475/5 |
| 9,017,028 B2* | 4/2015 | Fabre | F02K 3/072 416/129 |
| 10,954,813 B2 | 3/2021 | Wuestenberg | |
| 11,015,533 B2* | 5/2021 | Sheridan | F16H 1/28 |
| 11,186,378 B2* | 11/2021 | Dubreuil | F02C 7/32 |
| 11,891,967 B2* | 2/2024 | Yesilcimen | F01D 15/10 |
| 2009/0320491 A1 | 12/2009 | Copeland | |
| 2011/0305572 A1 | 12/2011 | Bellis | |
| 2012/0000177 A1 | 1/2012 | Vuillemin | |
| 2012/0177493 A1* | 7/2012 | Fabre | F02C 7/36 416/129 |
| 2014/0290265 A1* | 10/2014 | Ullyott | F02C 3/113 60/773 |
| 2015/0011354 A1* | 1/2015 | Fabre | F02C 7/06 475/331 |
| 2016/0076393 A1* | 3/2016 | Sheridan | F16H 1/2827 475/347 |
| 2016/0195096 A1* | 7/2016 | Otto | F01D 5/02 415/122.1 |
| 2016/0356225 A1 | 12/2016 | Sheridan | |
| 2018/0135512 A1* | 5/2018 | Poulin | F02C 3/113 |
| 2018/0328289 A1 | 11/2018 | Madge | |
| 2019/0061924 A1* | 2/2019 | Kita | B64D 27/10 |
| 2020/0017229 A1 | 1/2020 | Steinert | |
| 2020/0191062 A1* | 6/2020 | Sheridan | F02C 7/36 |
| 2020/0400077 A1* | 12/2020 | Redford | F02C 7/36 |
| 2021/0078700 A1* | 3/2021 | Klemen | B64D 35/04 |
| 2021/0229796 A1* | 7/2021 | Mitrovic | B64C 11/46 |
| 2022/0042461 A1* | 2/2022 | Molesini | F02C 7/06 |
| 2022/0235699 A1 | 7/2022 | Desjardins | |
| 2023/0382548 A1* | 11/2023 | Hanrahan | B64D 35/02 |
| 2023/0382549 A1* | 11/2023 | Hanrahan | B64D 35/04 |
| 2023/0383700 A1* | 11/2023 | Hanrahan | F02K 3/06 |
| 2024/0052784 A1* | 2/2024 | Hanrahan | F01D 25/164 |
| 2024/0052787 A1* | 2/2024 | Hanrahan | B64D 35/04 |
| 2024/0060453 A1* | 2/2024 | Hanrahan | F02C 3/107 |
| 2024/0077033 A1* | 3/2024 | Hanrahan | F02K 3/06 |
| 2024/0077034 A1* | 3/2024 | Hanrahan | F16H 37/065 |

FOREIGN PATENT DOCUMENTS

| | | | | |
|---|---|---|---|---|
| DE | 102013216802 A1 * | 2/2015 | | F16H 1/46 |
| DE | 102014208000 A1 * | 11/2015 | | F16H 37/0813 |
| FR | 2620107 A1 * | 3/1989 | | |
| FR | 2962109 A1 * | 1/2012 | | B64C 11/28 |

* cited by examiner

AIRCRAFT PROPULSION SYSTEM GEARTRAIN

This application claims priority to U.S. Provisional Patent Application No. 63/397,641 filed Aug. 12, 2022, which is hereby incorporated herein by reference in its entirety.

BACKGROUND OF THE DISCLOSURE

1. Technical Field

This disclosure relates generally to an aircraft propulsion system and, more particularly, to a geartrain for the aircraft propulsion system.

2. Background Information

Various types and configurations of geartrains for an aircraft propulsion system are known in the art for an aircraft. While these known aircraft propulsion system geartrains have various benefits, there is still room in the art for improvement.

SUMMARY OF THE DISCLOSURE

According to an aspect of the present disclosure, an assembly is provided for an aircraft. This aircraft assembly includes a geartrain, a first propulsor rotor and a rotating structure. The geartrain includes a first gear system and a second gear system. The first gear system includes a first sun gear, a first ring gear, a plurality of first intermediate gears and a first carrier. The first sun gear and the first ring gear are each rotatable about an axis. The first intermediate gears are between and meshed with the first sun gear and the first ring gear. Each of the first intermediate gears is rotatably mounted to the first carrier. The second gear system is interconnected with the first gear system. The second gear system includes a second sun gear, a second ring gear, a plurality of second intermediate gears and a second carrier. The second intermediate gears are between and meshed with the second sun gear and the second ring gear. Each of the second intermediate gears is rotatably mounted to the second carrier. The first propulsor rotor is coupled to the first ring gear. The rotating structure is coupled to the first sun gear and includes a turbine rotor. The rotating structure is configured to drive rotation of the first propulsor rotor through the geartrain.

According to another aspect of the present disclosure, another assembly is provided for an aircraft. This aircraft assembly includes a geartrain, a propulsor rotor and a rotating structure. The geartrain includes a first gear system and a second gear system. The first gear system includes a first sun gear, a first ring gear, a plurality of first intermediate gears and a first carrier. The first sun gear is rotatable about an axis. The first intermediate gears are between and meshed with the first sun gear and the first ring gear. Each of the first intermediate gears is rotatably mounted to the first carrier. The second gear system is interconnected with the first gear system. The second gear system includes a second sun gear, a second ring gear, a plurality of second intermediate gears and a second carrier. The second intermediate gears are between and meshed with the second sun gear and the second ring gear. Each of the second intermediate gears is rotatably mounted to the second carrier. The propulsor rotor is coupled to a component of the second gear system. The rotating structure is coupled to the first sun gear and comprising a turbine rotor. The rotating structure is configured to drive rotation of the propulsor rotor through the geartrain.

According to still another aspect of the present disclosure, another assembly is provided that includes a geartrain, a power output and a power input. The geartrain includes a first gear system and a second gear system. The first gear system includes a first sun gear, a first ring gear, a plurality of first intermediate gears and a first carrier. The first sun gear and the first ring gear are each rotatable about an axis. The first intermediate gears are between and meshed with the first sun gear and the first ring gear. Each of the first intermediate gears is rotatably mounted to the first carrier. The first carrier is rotatable about the axis. The second gear system is interconnected with the first gear system. The second gear system includes a second sun gear, a second ring gear, a plurality of second intermediate gears and a second carrier. The second sun gear and the second ring gear are each rotatable about the axis. The second intermediate gears are between and meshed with the second sun gear and the second ring gear. Each of the second intermediate gears is rotatably mounted to the second carrier. The second carrier is rotatable about the axis. The power output is coupled to one of the first ring gear, the second ring gear or the second carrier. The power input is coupled to the first sun gear. The power input is configured to drive rotation of the power output through the geartrain.

The component of the second gear system may be configured as or otherwise include the second ring gear.

The component of the second gear system may be configured as or otherwise include the second carrier.

The component of the second gear system may be configured as or otherwise include the second sun gear.

The assembly may also include a first propulsor rotor coupled to the first ring gear. The propulsor rotor may be a second propulsor rotor. The rotating structure may also be configured to drive rotation of the first propulsor rotor through the geartrain.

The first carrier and the second carrier may each be rotatable about the axis. The second carrier may be coupled to the first carrier.

The first carrier and the second ring gear may each be rotatable about the axis. The second ring gear may be coupled to the first carrier.

The power output may be coupled to the first ring gear.

The power output may be coupled to the second ring gear.

The power output may be coupled to the second carrier.

The power output may be configured as or otherwise include a propulsor rotor.

The power output may be configured as or otherwise include a generator rotor.

The power input may be configured as or otherwise include a turbine rotor within a turbine section of a gas turbine engine core.

The assembly may also include a second power output coupled to the second ring gear. The power input may also be configured to drive rotation of the second power output through the geartrain. The power output may be coupled to the first ring gear.

The assembly may also include a second power output coupled to the second carrier. The power input may also be configured to drive rotation of the second power output through the geartrain. The power output may be coupled to the first ring gear.

The second sun gear may be rotatable about the axis and coupled to the first ring gear.

The second sun gear may be rotatable about the axis and coupled to the first sun gear.

The first carrier and the second carrier may each be rotatable about the axis. The second carrier may be coupled to the first carrier. In some embodiments, the assembly may also include a lock device configured to lock rotation of the first carrier and the second carrier about the axis. The assembly may still also or alternatively include a brake configured to brake rotation of the first carrier and the second carrier about the axis. In some embodiments, the lock device may be configured as or otherwise include a splined coupling. In addition or alternatively, the brake may be configured as or otherwise include a disk brake.

The first carrier and the second ring gear may each be rotatable about the axis. The second ring gear may be coupled to the first carrier. In some embodiments, the assembly may also include a lock device configured to lock rotation of the first carrier and the second ring gear about the axis. The assembly may still also or alternatively include a brake configured to brake rotation of the first carrier and the second ring gear about the axis. In some embodiments, the lock device may be configured as or otherwise include a splined coupling. In addition or alternatively, the brake may be configured as or otherwise include a disk brake.

The second ring gear may be rotatable about the axis. In some embodiments, the assembly may also include a lock device configured to lock rotation of the second ring gear about the axis. The assembly may still also or alternatively include a brake configured to brake rotation of the second ring gear about the axis. In some embodiments, the lock device may be configured as or otherwise include a splined coupling. In addition or alternatively, the brake may be configured as or otherwise include a disk brake.

The second carrier may be rotatable about the axis. In some embodiments, the assembly may also include a lock device configured to lock rotation of the second carrier about the axis. The assembly may still also or alternatively include a brake configured to brake rotation of the second carrier about the axis. In some embodiments, the lock device may be configured as or otherwise include a splined coupling. In addition or alternatively, the brake may be configured as or otherwise include a disk brake.

The assembly may also include a second propulsor rotor coupled to a component of the second gear system. The rotating structure may be configured to drive rotation of the second propulsor rotor through the geartrain.

The component of the second gear system may be configured as or otherwise include the second ring gear.

The component of the second gear system may be configured as or otherwise include the second carrier.

The component of the second gear system may be configured as or otherwise include the second sun gear.

The first propulsor rotor may be rotatable about a first rotor axis. The second propulsor rotor may be rotatable about a second rotor axis that is angularly offset from the first rotor axis.

The first rotor axis may be coaxial with the axis.

The first propulsor rotor may be configured to generate propulsive force in a first direction. The second propulsor rotor may be configured to generate propulsive force in a second direction that is different than the first direction.

The first propulsor rotor may be configured as or otherwise include a ducted rotor. In addition or alternatively, the second propulsor rotor may be configured as or otherwise include an open rotor.

The assembly may also include a gas turbine engine core. The gas turbine engine core may include a compressor section, a combustor section, a turbine section and the rotating structure. The turbine rotor may be within the turbine section.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
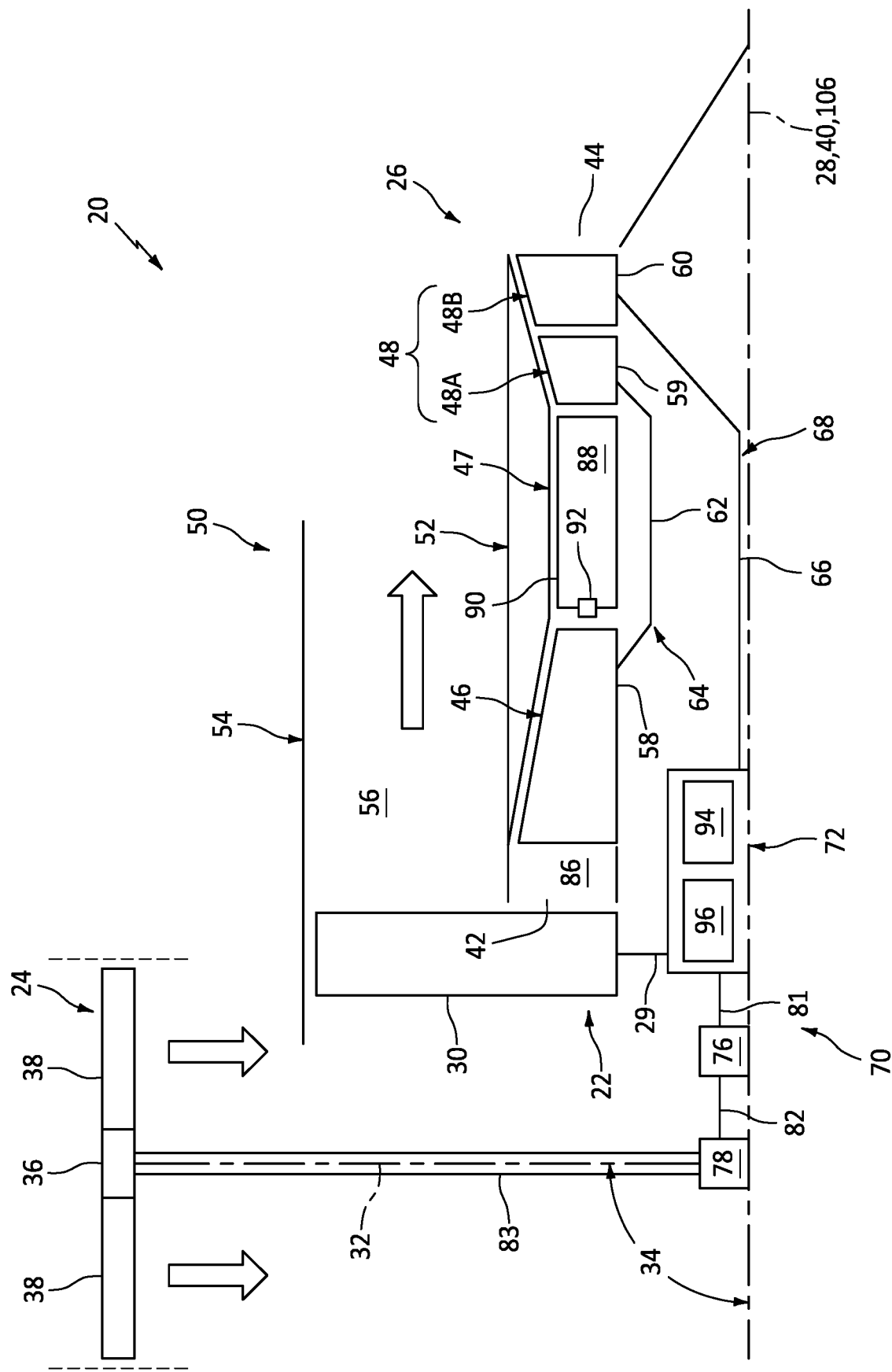
FIG. 1 is a partial, schematic illustration of an aircraft propulsion system.

FIG. 1 schematically illustrates a propulsion system 20 for an aircraft. The aircraft may be an airplane, a helicopter, a drone (e.g., an unmanned aerial vehicle (UAV)), a spacecraft or any other manned or unmanned aerial vehicle. This aircraft may be configured as a vertical take-off and landing (VTOL) aircraft or a short take-off and vertical landing (STOVL) aircraft. The aircraft propulsion system 20 of FIG. 1, for example, is configured to generate power for first direction propulsion (e.g., propulsive thrust) during a first mode of operation and to generate power for second direction propulsion (e.g., propulsive lift) during a second mode of operation, where the first direction is different than (e.g., angularly offset from) the second direction. The first mode may be a horizontal flight mode (e.g., a forward flight mode) where the first direction propulsion is substantially horizontal propulsive thrust; e.g., within five degrees (5°), ten degrees (10°), etc. of a horizontal axis. The second mode may be a vertical flight and/or hover mode where the second direction propulsion is substantially vertical propulsive lift; e.g., within five degrees (5°), ten degrees (10°), etc. of a vertical axis. The aircraft propulsion system 20, of course, may also be configured to generate both the first direction propulsion (e.g., horizontal propulsion) and the second direction propulsion (e.g., vertical propulsion) during a third mode (e.g., a transition mode) of operation.

The aircraft propulsion system 20 of FIG. 1 includes one or more bladed propulsor rotors such as, for example, at least one bladed first propulsor rotor 22 and at least one bladed second propulsor rotor 24. The aircraft propulsion system 20 of FIG. 1 also includes a gas turbine engine core 26 configured to rotatably drive the one or more propulsor rotors—the first propulsor rotor 22 and/or the second propulsor rotor 24.

The first propulsor rotor 22 may be configured as a ducted rotor such as a fan rotor. The first propulsor rotor 22 of FIG. 1 is rotatable about a first rotor axis 28. This first rotor axis 28 is an axial centerline of the first propulsor rotor 22 and may be horizontal when the aircraft is on ground and/or during level aircraft flight. The first propulsor rotor 22 includes at least a first rotor disk 29 and a plurality of first rotor blades 30 (one visible in FIG. 1); e.g., fan blades. The first rotor blades 30 are distributed circumferentially around the first rotor disk 29 in an annular array. Each of the first rotor blades 30 is connected to and projects radially (relative to the first rotor axis 28) out from the first rotor disk 29.

The second propulsor rotor 24 may be configured as an open rotor such as a propeller rotor or a helicopter (e.g., main) rotor. Of course, in other embodiments, the second propulsor rotor 24 may alternatively be configured as a ducted rotor such as a fan rotor; e.g., see dashed line duct. The second propulsor rotor 24 of FIG. 1 is rotatable about a second rotor axis 32. This second rotor axis 32 is an axial centerline of the second propulsor rotor 24 and may be vertical when the aircraft is on the ground and/or during level aircraft flight. The second rotor axis 32 is angularly offset from the first rotor axis 28 by an included angle 34; e.g., an acute angle or a right angle. This included angle 34 may be between sixty degrees (60°) and ninety degrees (90°); however, the present disclosure is not limited to such an exemplary relationship. The second propulsor rotor 24 includes at least a second rotor disk 36 and a plurality of second rotor blades 38; e.g., open rotor blades. The second rotor blades 38 are distributed circumferentially around the second rotor disk 36 in an annular array. Each of the second rotor blades 38 is connected to and projects radially (relative to the second rotor axis 32) out from the second rotor disk 36.

The engine core 26 extends axially along a core axis 40 between a forward, upstream airflow inlet 42 and an aft, downstream exhaust 44. The core axis 40 may be an axial centerline of the engine core 26 and may be horizontal when the aircraft is on the ground and/or during level aircraft flight. This core axis 40 may be parallel (e.g., coaxial) with the first rotor axis 28 and, thus, angularly offset from the second rotor axis 32. The engine core 26 of FIG. 1 includes a compressor section 46, a combustor section 47 and a turbine section 48. The turbine section 48 of FIG. 1 includes a high pressure turbine (HPT) section 48A and a low pressure turbine (LPT) section 48B (also sometimes referred to as a power turbine section).

The engine sections 46-48B are arranged sequentially along the core axis 40 within an engine housing 50. This engine housing 50 includes an inner case 52 (e.g., a core case) and an outer case 54 (e.g., a fan case). The inner case 52 may house one or more of the engine sections 46-48B; e.g., the engine core 26. The outer case 54 may house the first propulsor rotor 22. The outer case 54 of FIG. 1 also axially overlaps and extends circumferentially about (e.g., completely around) the inner case 52 thereby at least partially forming a (e.g., annular) bypass flowpath 56 radially between the inner case 52 and the outer case 54.

Each of the engine sections 46, 48A and 48B includes a bladed rotor 58-60 within that respective engine section 46, 48A, 48B. Each of these bladed rotors 58-60 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The compressor rotor 58 is connected to the HPT rotor 59 through a high speed shaft 62. At least (or only) these engine components 58, 59 and 62 collectively form a high speed rotating structure 64. This high speed rotating structure 64 is rotatable about the core axis 40. The LPT rotor 60 is connected to a low speed shaft 66. At least (or only) these engine components 60 and 66 collectively form a low speed rotating structure 68. This low speed rotating structure 68 is rotatable about the core axis 40. The low speed rotating structure 68 and, more particularly, its low speed shaft 66 may project axially through a bore of the high speed rotating structure 64 and its high speed shaft 62.

The aircraft propulsion system 20 of FIG. 1 includes a powertrain 70 that couples the low speed rotating structure 68 to the first propulsor rotor 22 and that couples the low speed rotating structure 68 to the second propulsor rotor 24. The powertrain 70 of FIG. 1 includes a geartrain 72, a transmission 76 and a gearing 78; e.g., bevel gearing. The powertrain 70 of FIG. 1 also includes one or more shafts 81-83 and/or other intermediate torque transmission devices for coupling the geartrain 72 to the second propulsor rotor 24. The powertrain 70 may also include one or more intermediate torque transmission devices for coupling the geartrain 72 to the first propulsor rotor 22.

An input to the geartrain 72 is coupled to the low speed rotating structure 68 and its low speed shaft 66, where the low speed rotating structure 68 forms a power input for the geartrain 72. A first output from the geartrain 72 is coupled to the first propulsor rotor 22, where the first propulsor rotor 22 forms a first power output (e.g., load) for the geartrain 72. A second output from the geartrain 72 is coupled to the second propulsor rotor 24 through the powertrain elements 81, 76, 82, 78 and 83, where the second propulsor rotor 24 forms a second power output (e.g., load) for the geartrain 72.

An output of the transmission 76 is connected to the gearing 78 through the transmission output shaft 82. This transmission 76 may be configured to selectively couple (e.g., transfer mechanical power between) the geartrain output shaft 81 and the transmission output shaft 82. During the first mode of operation, for example, the transmission 76 may be configured to decouple the geartrain output shaft 81 from the transmission output shaft 82, thereby decoupling the low speed rotating structure 68 from the second propulsor rotor 24. During the second mode of operation (and the third mode of operation), the transmission 76 may be configured to couple the geartrain output shaft 81 with the transmission output shaft 82, thereby coupling the low speed rotating structure 68 with the second propulsor rotor 24. The transmission 76 may be configured as a clutched or clutchless transmission.

An output of the gearing 78 is connected to the second propulsor rotor 24 through the second propulsor shaft 83. This gearing 78 provides a coupling between the transmission output shaft 82 rotating about the axis 28, 40 and the second propulsor shaft 83 rotating about the second rotor axis 32. The gearing 78 may also provide a speed change mechanism between the transmission output shaft 82 and the second propulsor shaft 83. The gearing 78, however, may alternatively provide a 1:1 rotational coupling between the transmission output shaft 82 and the second propulsor shaft 83 such that these shafts 82 and 83 rotate at a common (e.g., the same) speed. Furthermore, in some embodiments, the gearing 78 and the transmission output shaft 82 may be omitted where the functionality of the gearing 78 is integrated into the transmission 76. In still other embodiments, the transmission 76 may be omitted where decoupling of the second propulsor rotor 24 is not required and/or where an optional additional speed change between the second output of the geartrain 72 and the second propulsor rotor 24 is not required.

During operation of the aircraft propulsion system 20, air enters the engine core 26 through the airflow inlet 42. This air is directed into a (e.g., annular) core flowpath 86 which extends sequentially through the compressor section 46, the combustor section 47, the HPT section 48A and the LPT section 48B to the exhaust 44. The air within this core flowpath 86 may be referred to as core air.

The core air is compressed by the compressor rotor 58 and directed into a (e.g., annular) combustion chamber 88 of a (e.g., annular) combustor 90 in the combustor section 47. Fuel is injected into the combustion chamber 88 through one or more fuel injectors 92 (one visible in FIG. 1) and mixed with the compressed core air to provide a fuel-air mixture. This fuel-air mixture is ignited and combustion products thereof flow through and sequentially cause the HPT rotor 59 and the LPT rotor 60 to rotate. The rotation of the HPT rotor 59 drives rotation of the high speed rotating structure 64 and its compressor rotor 58. The rotation of the LPT rotor 60 drives rotation of the low speed rotating structure 68. The rotation of the low speed rotating structure 68 drives rotation of the first propulsor rotor 22 through the geartrain 72 during a select mode or modes of operation; e.g., the first and the third modes of operation. The rotation of the low speed rotating structure 68 drives rotation of the second propulsor rotor 24 through the geartrain 72 during a select mode or modes of operation; e.g., the second and the third modes of operation. During the first mode of operation, the transmission 76 may decouple the low speed rotating structure 68 from the second propulsor rotor 24 such that the low speed rotating structure 68 does not drive rotation of the second propulsor rotor 24. The second propulsor rotor 24 may thereby be stationary (or windmill) during the first mode of operation.

During the first and the third modes of operation, the rotation of the first propulsor rotor 22 propels bypass air (separate from the core air) through the aircraft propulsion system 20 and its bypass flowpath 56 to provide the first direction propulsion; e.g., the forward, horizontal thrust. During the second and the third modes of operation, the rotation of the second propulsor rotor 24 propels additional air (separate from the core air and the bypass air) to provide the second direction propulsion; e.g., vertical lift. The aircraft may thereby takeoff, land and/or otherwise hover during the second and the third modes of operation, and the aircraft may fly forward or otherwise move during the first and the third modes of operation.

Figure 2:
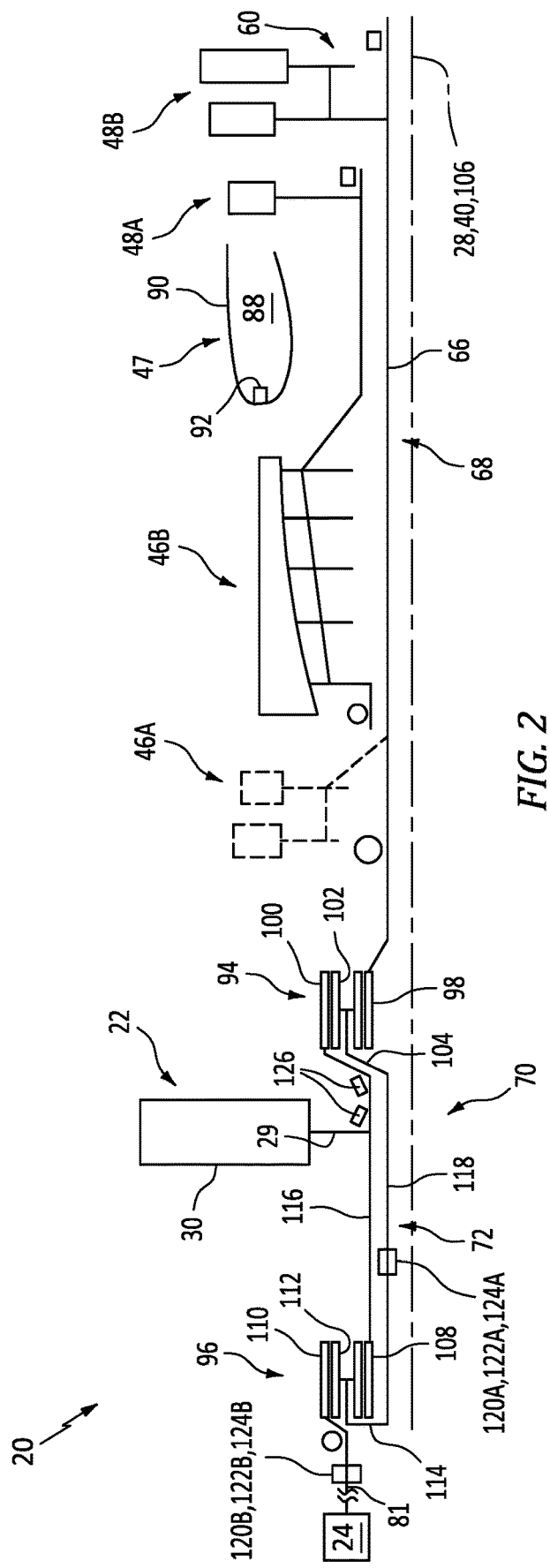
FIG. 2 is a schematic illustration of a portion of the aircraft propulsion system of FIG. 1 shown with an optional low pressure compressor section.
Figure 3:
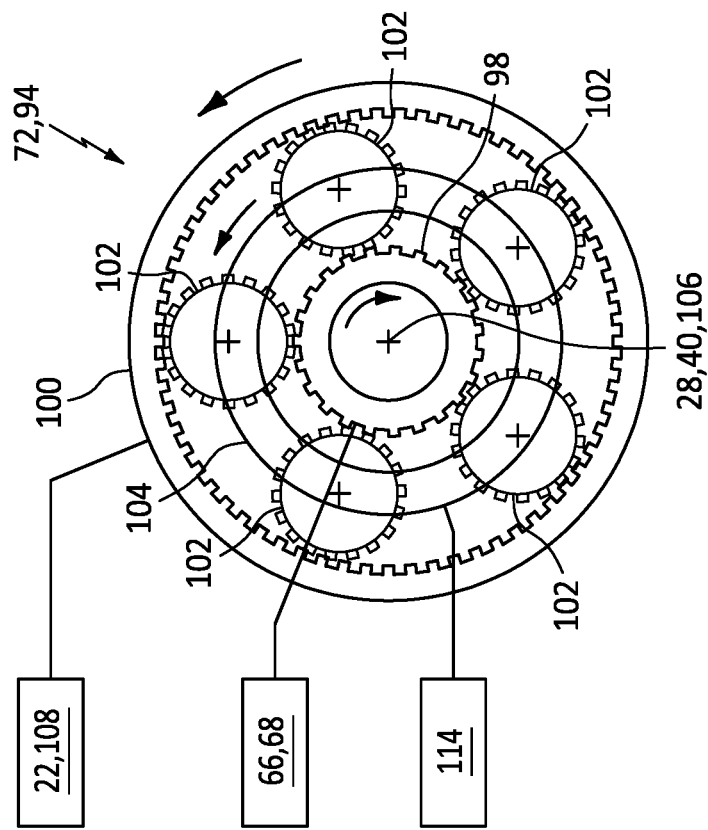
FIG. 3 is a schematic illustration of a first gear system coupled with various components of the aircraft propulsion system of FIG. 2.

Referring to FIG. 2, the geartrain 72 may include multiple (e.g., epicyclic) interconnected gear systems 94 and 96. Referring to FIGS. 2 and 3, the first gear system 94 includes a first sun gear 98, a first ring gear 100, a plurality of first intermediate gears 102 and a first carrier 104. The first sun gear 98 is rotatable about a rotational axis 106 of the geartrain 72, which rotational axis 106 may be parallel (e.g., coaxial) with the axis 28, 40. The first ring gear 100 circumscribes the first sun gear 98 and is rotatable about the axis 28, 40, 106. Each of the first intermediate gears 102 is disposed between and meshed with the first sun gear 98 and the first ring gear 100. Each of the first intermediate gears 102 is rotatably mounted to the first carrier 104. The first carrier 104 is rotatable about the axis 28, 40, 106.

Figure 4:
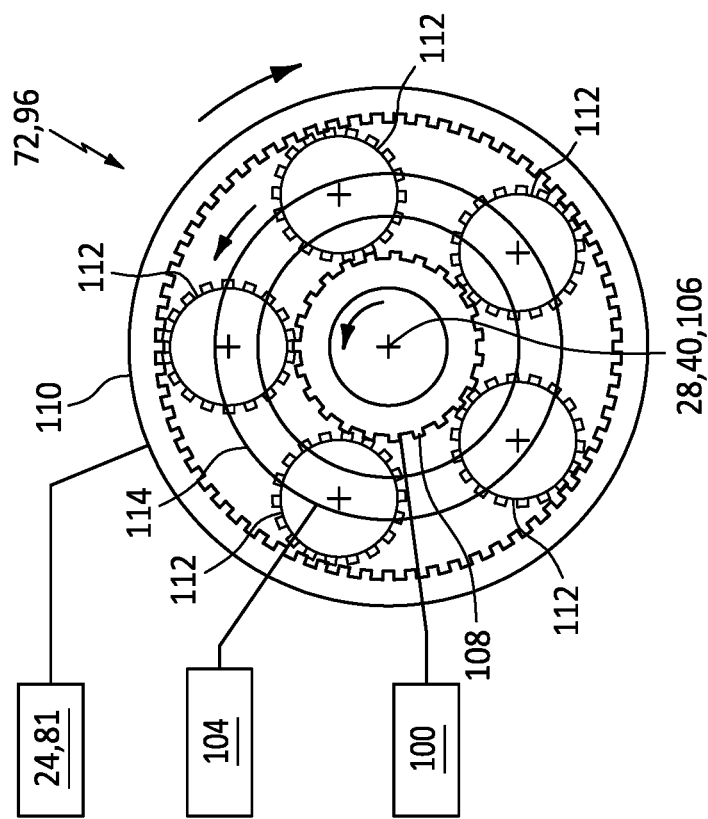
FIG. 4 is a schematic illustration of a second gear system coupled with various components of the aircraft propulsion system of FIG. 2.

Referring to FIGS. 2 and 4, the second gear system 96 includes a second sun gear 108, a second ring gear 110, a plurality of second intermediate gears 112 and a second carrier 114. The second sun gear 108 is rotatable about the axis 28, 40, 106. This second sun gear 108 is coupled to (e.g., via a shaft 116 and/or another coupling device) and rotatable with the first ring gear 100. The second ring gear 110 circumscribes the second sun gear 108 and is rotatable about the axis 28, 40, 106. Each of the second intermediate gears 112 is disposed between and meshed with the second sun gear 108 and the second ring gear 110. Each of the second intermediate gears 112 is rotatably mounted to the second carrier 114. The second carrier 114 is rotatable about the axis 28, 40, 106. This second carrier 114 is coupled to (e.g., via a shaft 118 and/or another coupling device) and rotatable with the first carrier 104.

Referring to FIG. 2, the first propulsor rotor 22 is coupled to and is configured to be rotatably driven by the first ring gear 100. The first propulsor rotor 22 of FIG. 2, for example, is connected to the shaft 116 extending between and connected to the first ring gear 100 and the second sun gear 108. The first propulsor rotor 22 may thereby be coupled to the geartrain 72 (e.g., and positioned) between the first gear system 94 and the second gear system 96. The second propulsor rotor 24 (see also FIG. 1) is coupled to and is configured to be rotatably driven by the second ring gear 110. The low speed rotating structure 68 and its LPT rotor 60 are coupled to and are configured to rotatably drive the first sun gear 98. With this arrangement, the first gear system 94 is between and couples the low speed rotating structure 68 and the first propulsor rotor 22. The geartrain 72 along with its first and its second gear systems 94 and 96 are between and couple the low speed rotating structure 68 and the second propulsor rotor 24 (see also FIG. 1). The low speed rotating structure 68 and its LPT rotor 60 may thereby power/drive rotation of the first propulsor rotor 22 and/or the second propulsor rotor 24 (see also FIG. 1) through the geartrain 72 and its interconnected gear systems 94 and 96. Including the multiple gear systems 94 and 96 within a common gearbox may facilitate torque sharing between the first gear system 94 and the second gear system 96. This torque sharing may facilitate a reduction in sizing of the first gear system 94 and/or the second gear system 96, compared to a gearbox with a single gear system.

The aircraft propulsion system 20 may include one or more brakes 120A and 120B (generally referred to as "120") and/or one or more lock devices 122A and 122B (generally referred to as "122"). The first brake 120A and/or the first lock device 122A may be located at a first location 124A, or another suitable location. The second brake 120B and/or the second lock device 122B may be located at a second location 124B, or another suitable location.

Figure 5:
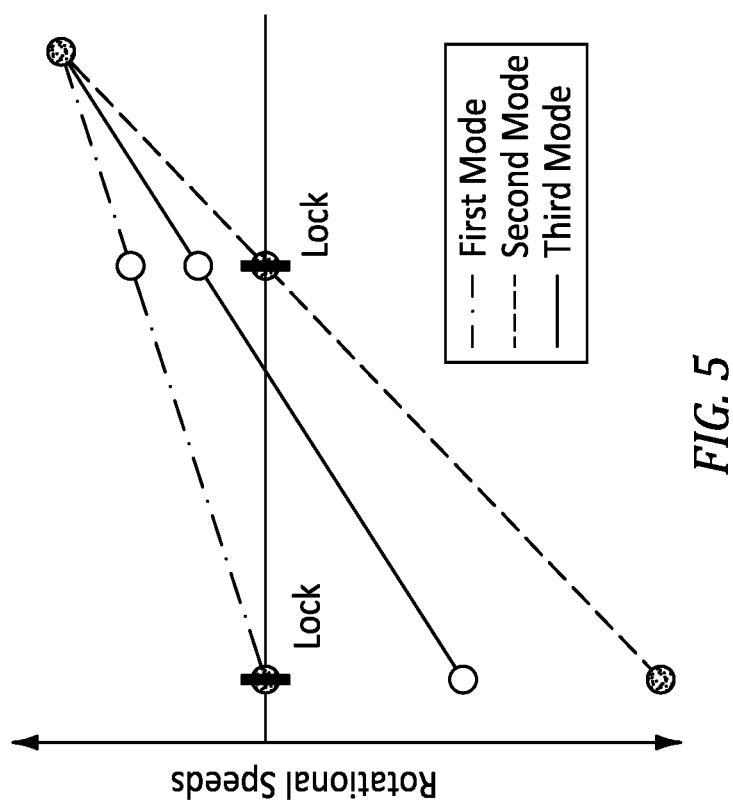
FIG. 5 is a graph depicting changes to rotational speeds during various modes of propulsion system operation for the aircraft propulsion system of FIG. 2.

The first brake 120A of FIG. 2 is configured to brake (e.g., slow and/or stop) rotation of the carriers 104 and 114 about the axis 28, 40, 106. The first lock device 122A is configured to lock (e.g., fix, prevent) rotation of the carriers 104 and 114 about the axis 28, 40, 106, for example, following the braking of the carriers 104 and 114 to zero rotational speeds about the axis 28, 40, 106 using the first brake 120A. When the carriers 104 and 114 are rotationally fixed (e.g., during the second mode of operation of FIG. 5), a rotational speed of the first propulsor rotor 22 may decrease (compared to when the second carrier 114 is free to rotate).

Reducing the rotational speed of the first propulsor rotor 22 during, for example, the second mode of operation reduces or substantially eliminates (e.g., de minimis) the first direction propulsive thrust generated by the first propulsor rotor 22. Reducing first propulsor rotor thrust may, in turn, increase power available for driving rotation of the second propulsor rotor 24 and/or facilitate substantial second direction aircraft movement; e.g., without first direction aircraft movement. However, maintaining some rotation of the first propulsor rotor 22 may maintain lubrication of one or more bearings (e.g., bearings 126 in FIG. 2) supporting the first propulsor rotor 22 and/or prevent bearing related damage. For example, when a component supported by a bearing is not rotating, shock loads may damage one of more internal components of the bearing. Examples of such bearing damage may include, but are not limited to, brinelling and false brinelling. Maintaining some rotation of the first propulsor rotor 22 of FIG. 1 may also or alternatively prevent an exhaust backflow through the bypass flowpath 56 into the inlet 42. Maintaining some rotation of the first propulsor rotor 22 may still also or alternatively prevent debris (e.g., sand, dirt, dust, etc.) from entering the inlet 42 during the second mode of operation where the aircraft is more likely to be near the ground; e.g., for landing or takeoff.

The second brake 120B of FIG. 2 is configured to brake (e.g., slow and/or stop) rotation of the second propulsor rotor 24 about the axis 32 (see FIG. 1) and, thus, the second ring gear 110. The second lock device 122B is configured to lock (e.g., fix, prevent) rotation of the second propulsor rotor 24 about the axis 32 (see FIG. 1) (and rotation of the second ring gear 110 about the axis 28, 40, 106), for example, following the braking of the second propulsor rotor 24 to a zero rotational speed about the axis 32 using the second brake 120B. When the second propulsor rotor 24 of FIG. 1 is rotationally fixed (e.g., during the first mode of operation of FIG. 5), the geartrain 72 may transfer (e.g., all, minus losses in the powertrain 70) the power output from the low speed rotating structure 68 and its LPT rotor 60 to the first propulsor rotor 22 and any powertrain element(s) therebetween (when included).

To enter the third mode of operation from the first mode of operation, the second lock device 122B may be disengaged and/or the second brake 120B may be released. The second propulsor rotor 24 may thereby begin to rotate along with the already rotating first propulsor rotor 22. Similarly, to enter the third mode of operation from the second mode of operation, the first lock device 122A may be disengaged and/or the first brake 120A may be released. The first propulsor rotor 24 may thereby begin to rotate faster along with the already rotating second propulsor rotor 24. When both of the propulsor rotors 22 and 24 are rotating/free to rotate (e.g., during the third mode of operation of FIG. 5), the geartrain 72 may transfer (e.g., all, minus losses in the powertrain 70) the power output from the low speed rotating structure 68 and its LPT rotor 60 to (I) the first propulsor rotor 22 and the powertrain element(s) therebetween and (II) the second propulsor rotor 24 and the powertrain element(s) therebetween.

Figure 6:
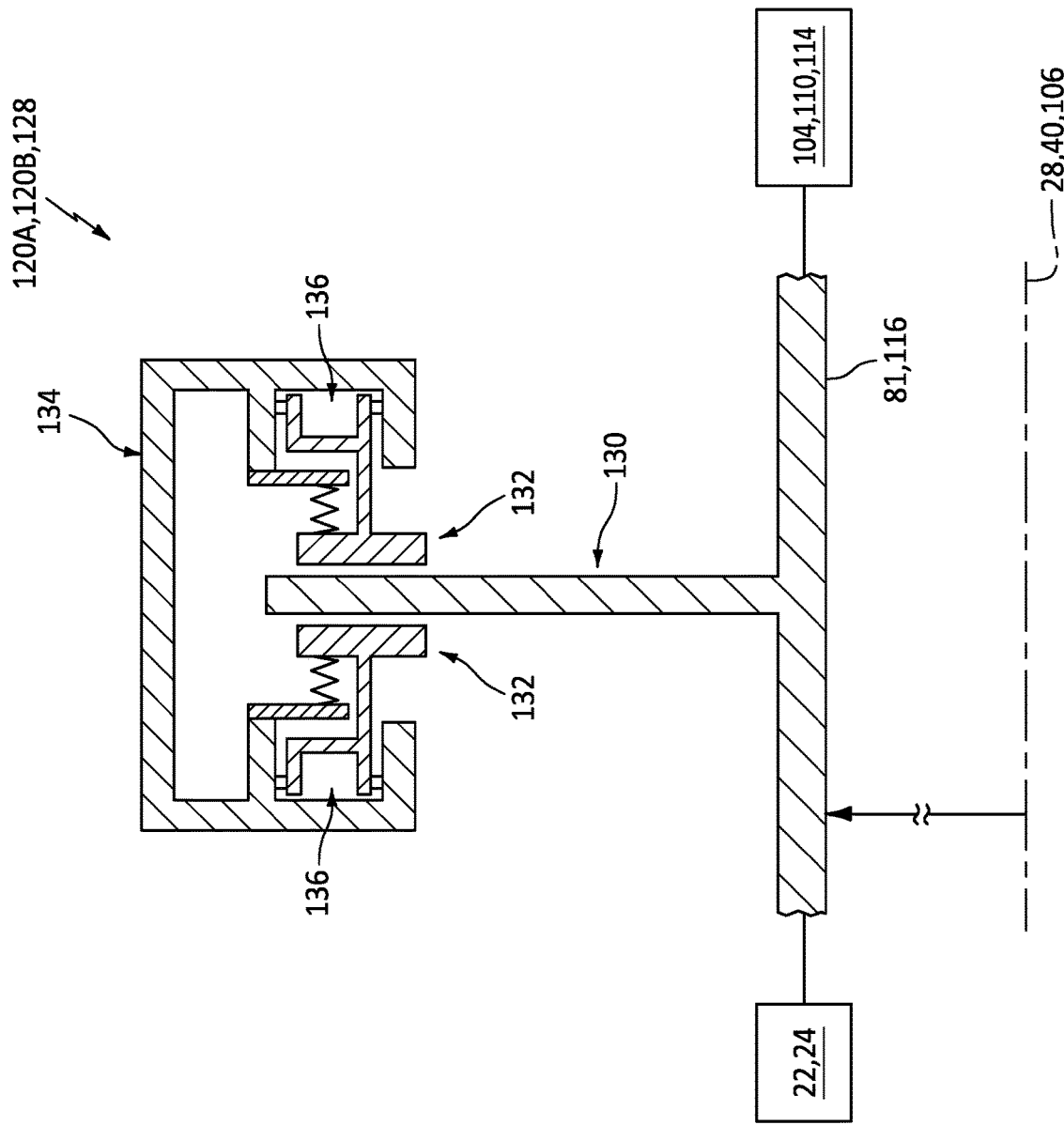
FIG. 6 is a partial, side sectional illustration of a rotating assembly configured with a brake.

Referring to FIG. 6, the first brake 120A and/or the second brake 120B may each be configured as or otherwise include a disk brake 128. The disk brake 128 of FIG. 6 includes a brake rotor 130 and one or more brake pads 132. The brake rotor 130 is configured rotatable with the respective propulsor rotor 22, 24. The brake rotor 130, for example, may be connected to and rotatable with the respective shaft 116, 81, or another rotating element (directly or indirectly) rotatable with the respective propulsor rotor 22, 24. The brake pads 132 are anchored to a stationary structure 134, which may be part of the engine housing 50 and/or an airframe of the aircraft (see FIG. 1). The brake pads 132 may be actuated by one or more brake actuators 136 (e.g., hydraulic brake actuators) to move the brake pads 132 from an open position to a closed position. In the open position, the brake pads 132 are spaced from and do not engage (e.g., contact) the brake rotor 130 (see position of FIG. 6). In the closed position, the brake pads 132 engage (e.g., contact) and clamp onto (e.g., squeeze) the brake rotor 130. Frictional rubbing between the brake pads 132 and the brake rotor 130 is operable to brake rotation of the brake rotor 130 and, thus, the respective shaft 116, 81 (or another rotating element) connected thereto. The first and the second brakes 120 of the present disclosure, however, are not limited to such an exemplary disk brake configuration. Furthermore, it is contemplated the first and/or the second brake 120 may alternatively be configured as another type of brake such as, for example, a drum brake or a set of clutch plates.

Figure 7:
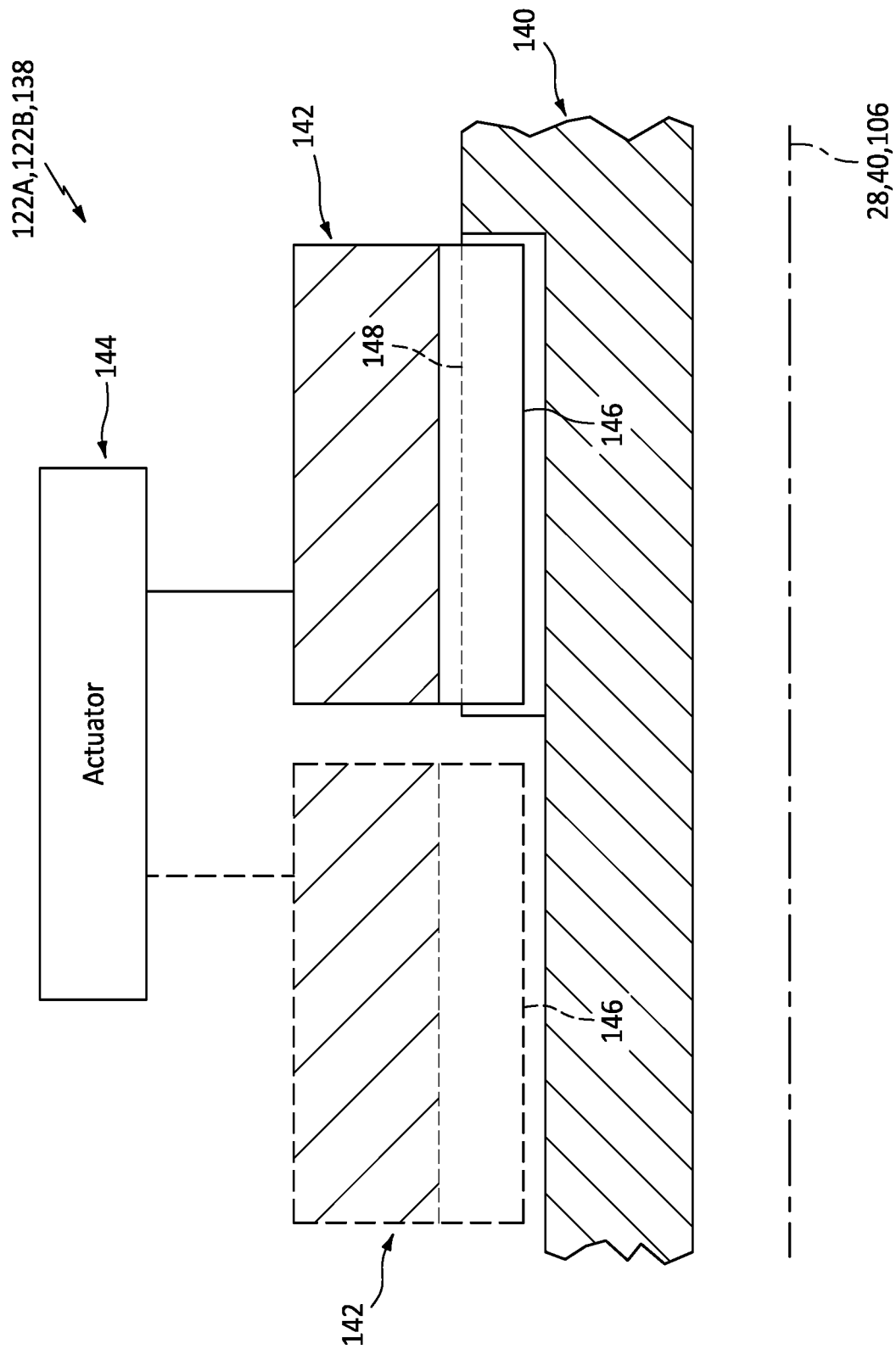
FIG. 7 is a partial, side sectional schematic illustration of a lock device.

Referring to FIG. 7, the first lock device 122A and/or the second lock device 122B may each be configured as a splined lock device 138; e.g., a splined coupling. The lock device 138 of FIG. 7, for example, includes an inner lock element 140 (e.g., a splined sleeve) and an actuator 144. The inner lock element 140 is rotatable about the axis 28, 40, 106. The outer lock element 142 is rotationally fixed about the axis 28, 40, 106. However, the actuator 144 is configured to move (e.g., axially translate) the outer lock element 142 along the axis 28, 40, 106 and the inner lock element 140 between an unlocked position (see dashed line in FIG. 7) and a locked position (see solid line in FIG. 7; see also FIG. 8). At the unlocked position, inner splines 146 of the outer lock element 142 are disengaged (e.g., spaced) from outer splines 148 of the inner lock element 140. At the locked position, the inner splines 146 of the outer lock element 142 are engaged (e.g., meshed) with the outer splines 148 of the inner lock element 140 (see also FIG. 8). With this arrangement, when the lock device 138 is unlocked and its outer lock element 142 is in the unlocked position, the inner lock element 140 may rotate (e.g., freely, unencumbered by the outer lock element 142) about the axis 28, 40, 106. However, when the lock device 138 is locked and its outer lock element 142 is in the locked position of FIG. 8, the outer lock element 142 is meshed with the inner lock element 140 and prevents rotation of the inner lock element 140 about the axis 28, 40, 106.

Figure 8:
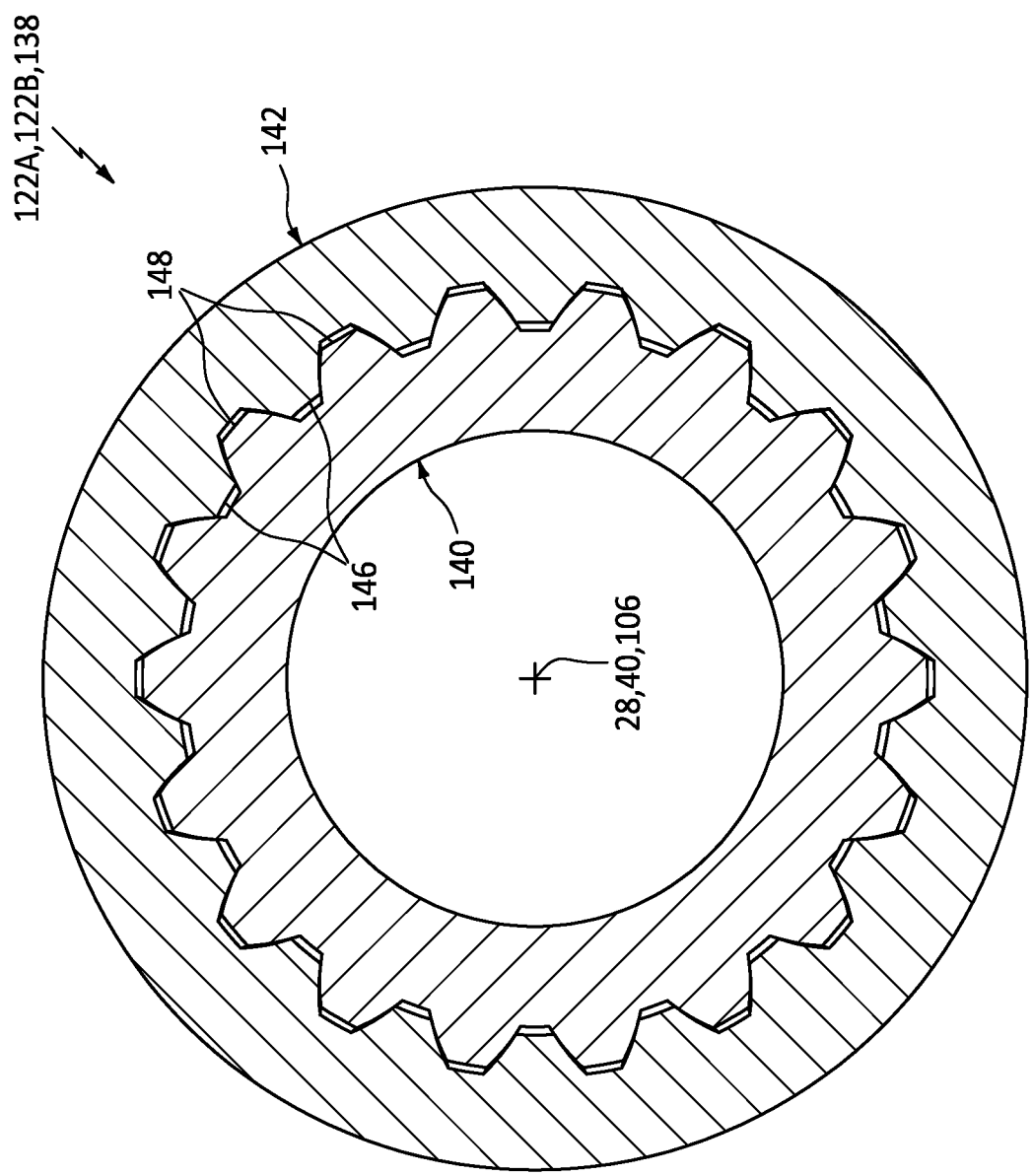
FIG. 8 is a cross-sectional illustration of the lock device of FIG. 7.

Referring to FIGS. 2 and 7, the inner lock element 140 of the first lock device 122A may be configured as part of or may be attached (directly or indirectly) to the shaft 116, or any other element rotatable therewith. The inner lock element 140 of the second lock device 122B may be configured as part of or may be attached (directly or indirectly) to the geartrain output shaft 81, or any other element rotatable therewith. While the inner lock element 140 of FIGS. 7 and 8 is described as the rotating element and the outer lock element 142 is described as the rotationally fixed element, the operation of these elements may be switched in other embodiments. In particular, the inner lock element 140 may alternatively be configured as the rotationally fixed element and axially translatable by the actuator 144, and the outer lock element 142 may be configured as the rotating element. Furthermore, various other types of rotational lock devices are known in the art, and the present disclosure is not limited to any particular ones thereof.

Figure 9:
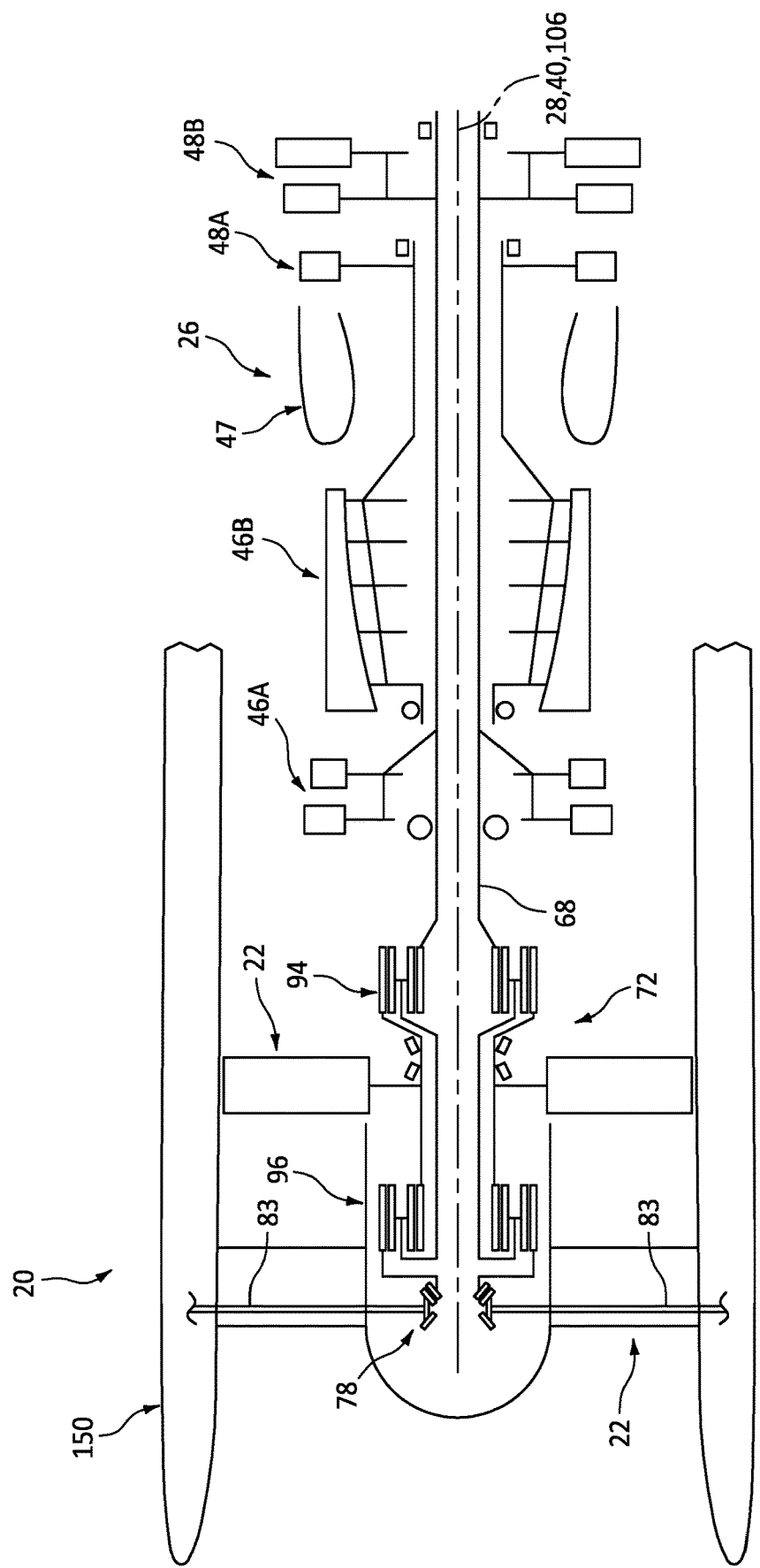
FIG. 9 is a schematic illustration of components of the aircraft propulsion system configured within a nacelle.
Figure 10:
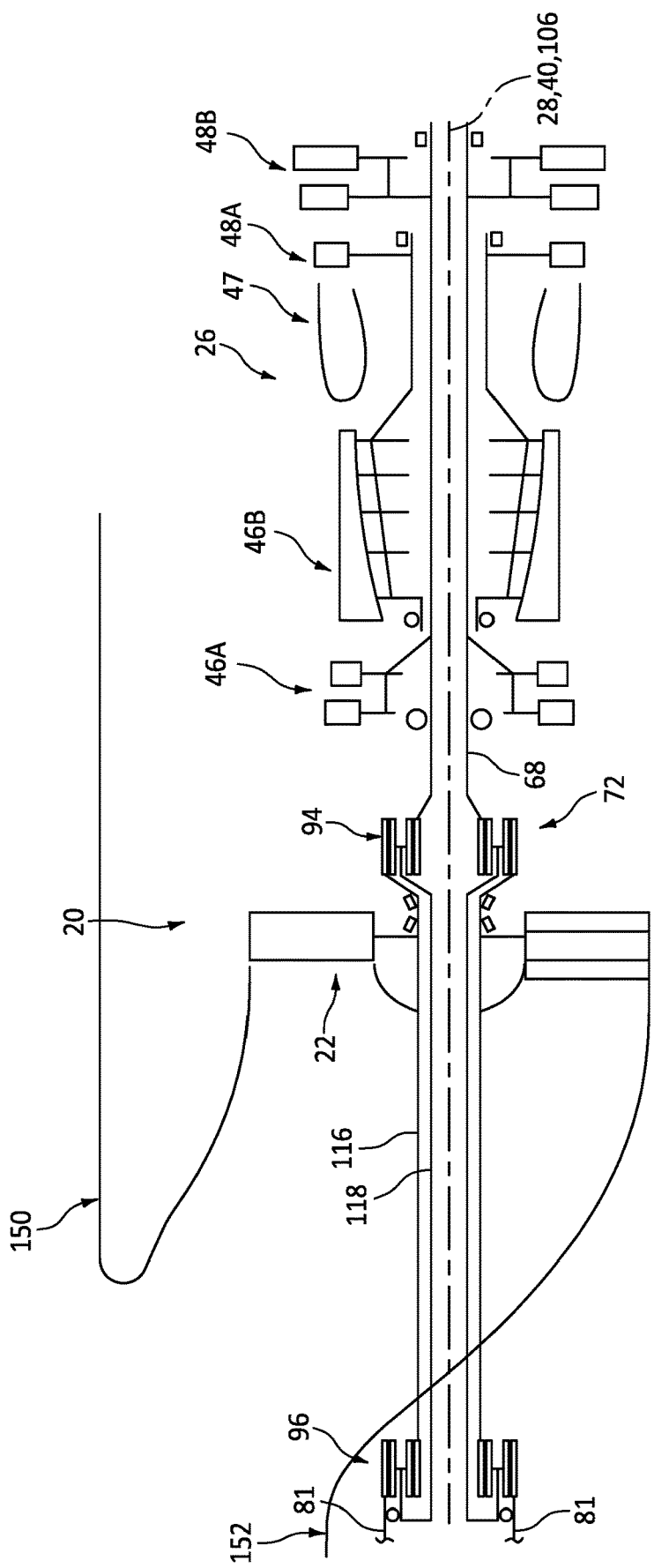
FIG. 10 is a schematic illustration of some components of the aircraft propulsion system configured within a nacelle and other components of the aircraft propulsion system configured within an airframe.

Referring to FIG. 9, the geartrain 72 and its gear systems 94 and 96 may be arranged within a nacelle 150 for the aircraft propulsion system 20. This nacelle 150 may be configured discrete from an airframe of the aircraft. The aircraft propulsion system 20 and its nacelle 150, for example, may be mounted to a component of the airframe (e.g., a fuselage, a wing, etc.) by a pylon. In other embodiments, referring to FIG. 10, the second gear system 96 may be arranged remote from the engine core 26 and the front gear system 94. The first propulsor rotor 22, the engine core 26 and the first gear system 94 of FIG. 10, for example, may be arranged in the nacelle 150. The second gear system 96 of FIG. 10, by contrast, may be arranged in or otherwise with a component 152 of the aircraft airframe; e.g., a fuselage, a wing, etc. In still other embodiments, at least the engine core 26 and geartrain 72 including its first and second gear systems 94 and 96 may be arranged within the aircraft airframe.

Figure 11:
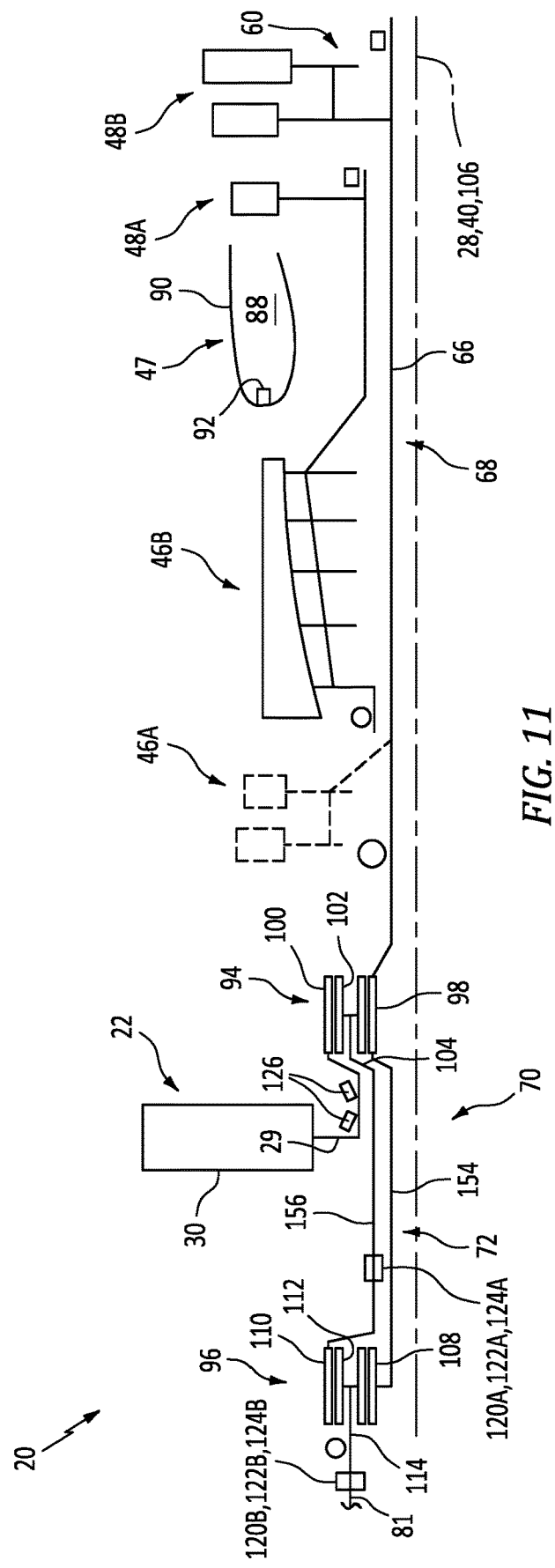
FIG. 11 is a schematic illustration of the aircraft propulsion system of FIG. 2 shown with another geartrain arrangement.
Figure 13:
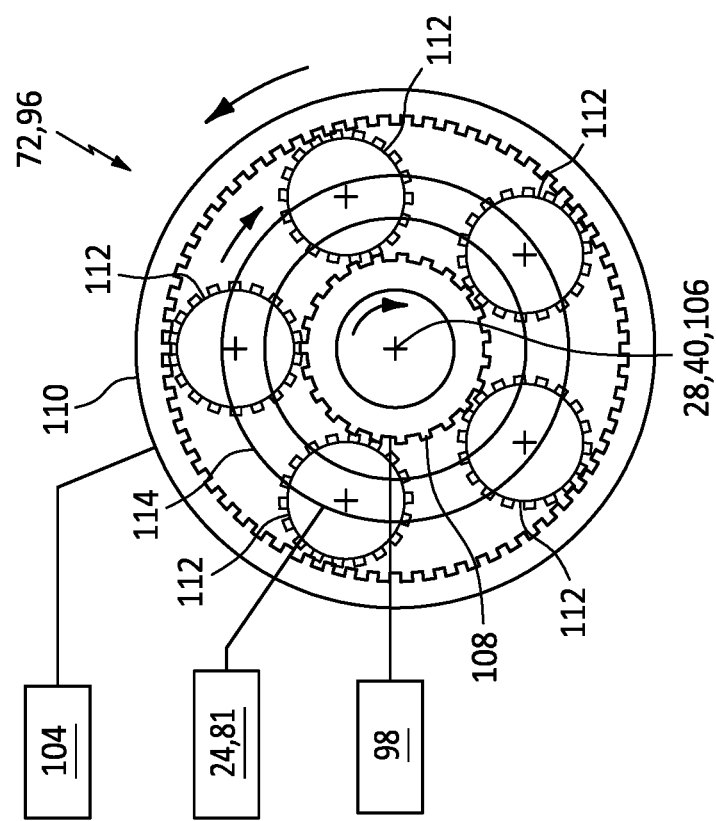
FIG. 13 is a schematic illustration of the second gear system coupled with various components of the aircraft propulsion system of FIG. 11.
Figure 12:
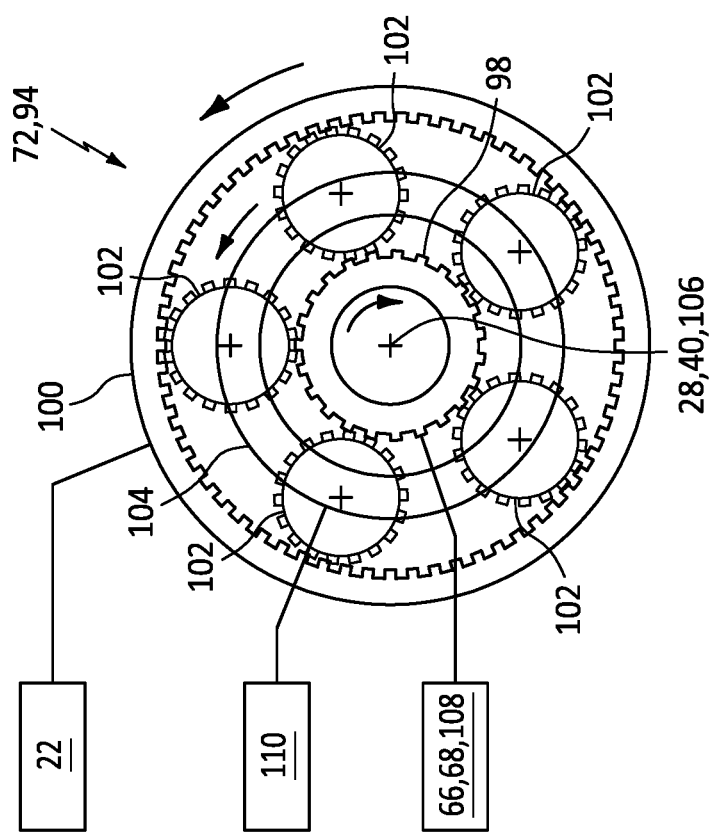
FIG. 12 is a schematic illustration of the first gear system coupled with various components of the aircraft propulsion system of FIG. 11.

The geartrain 72 and its first and second gear systems 72 and 96 may be interconnected and/or coupled with its power input and outputs with various arrangements other than that described above with respect to FIGS. 2-4. The second sun gear 108 of FIGS. 11-13, for example, is coupled to (e.g., via a shaft 154 and/or another coupling device) and rotatable with the first sun gear 98. The second ring gear 110 is coupled to (e.g., via a shaft 156 and/or another coupling device) and rotatable with the first carrier 104. The first propulsor rotor 22 of FIG. 11 is coupled to and is configured to be rotatably driven by the first ring gear 100. The second propulsor rotor 24 (see FIG. 1) is coupled to and is configured to be rotatably driven by the second carrier 114. The low speed rotating structure 68 and its LPT rotor 60 are coupled to and are configured to rotatably drive the first sun gear 98.

Figure 14:
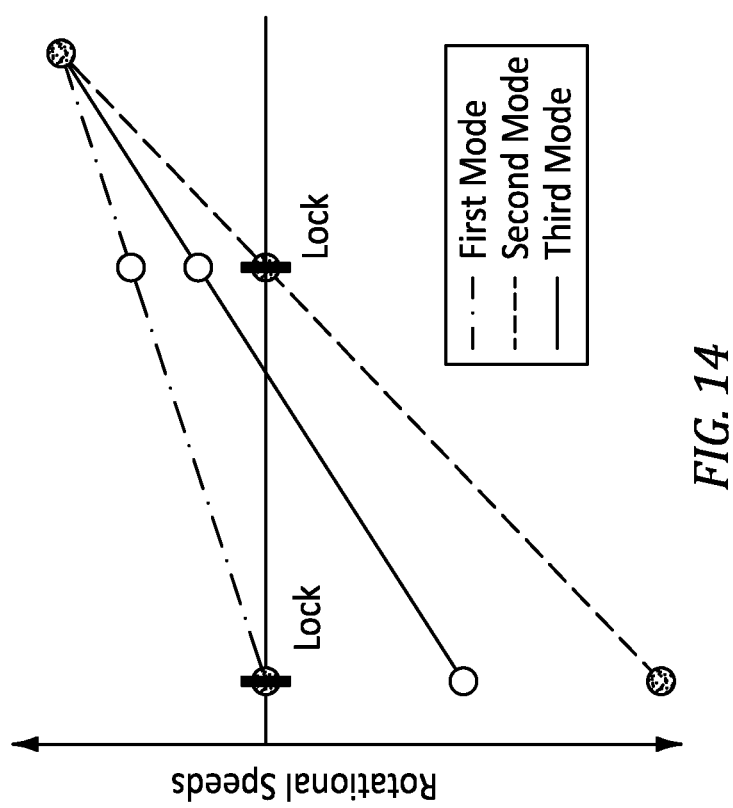
FIG. 14 is a graph depicting changes to rotational speeds during various modes of propulsion system operation for the aircraft propulsion system of FIG. 11.

The first brake 120A of FIG. 11 is configured to brake (e.g., slow and/or stop) rotation of the first carrier 104 and the second ring gear 110 about the axis 28, 40, 106. This first brake 120A may be configured with the shaft 156. The first lock device 122A is configured to lock (e.g., fix, prevent) rotation of the first carrier 104 and the second ring gear 110 about the axis 28, 40, 106, for example, following the braking of the first carrier 104 and the second ring gear 110 to zero rotational speeds about the axis 28, 40, 106 using the first brake 120A. This first lock device 122A may be configured with the shaft 156. When the first carrier 104 and the second ring gear 110 are rotationally fixed (e.g., during the second mode of operation of FIG. 14), a rotational speed of the first propulsor rotor 22 may decrease (compared to when the second ring gear 110 is free to rotate).

The second brake 120B of FIG. 11 is configured to brake (e.g., slow and/or stop) rotation of the second propulsor rotor 24 about the axis 32 (see FIG. 1) and, thus, the second carrier 114. The second lock device 122B is configured to lock (e.g., fix, prevent) rotation of the second propulsor rotor 24 about the axis 32 (see FIG. 1) (and the second carrier 114). When the second carrier 114 is rotationally fixed (e.g., during the first mode of operation of FIG. 14), the geartrain 72 may transfer (e.g., all, minus losses in the powertrain 70) the power output from the low speed rotating structure 68 and its LPT rotor 60 to the first propulsor rotor 22 and any powertrain element(s) therebetween (when included).

Figure 17:
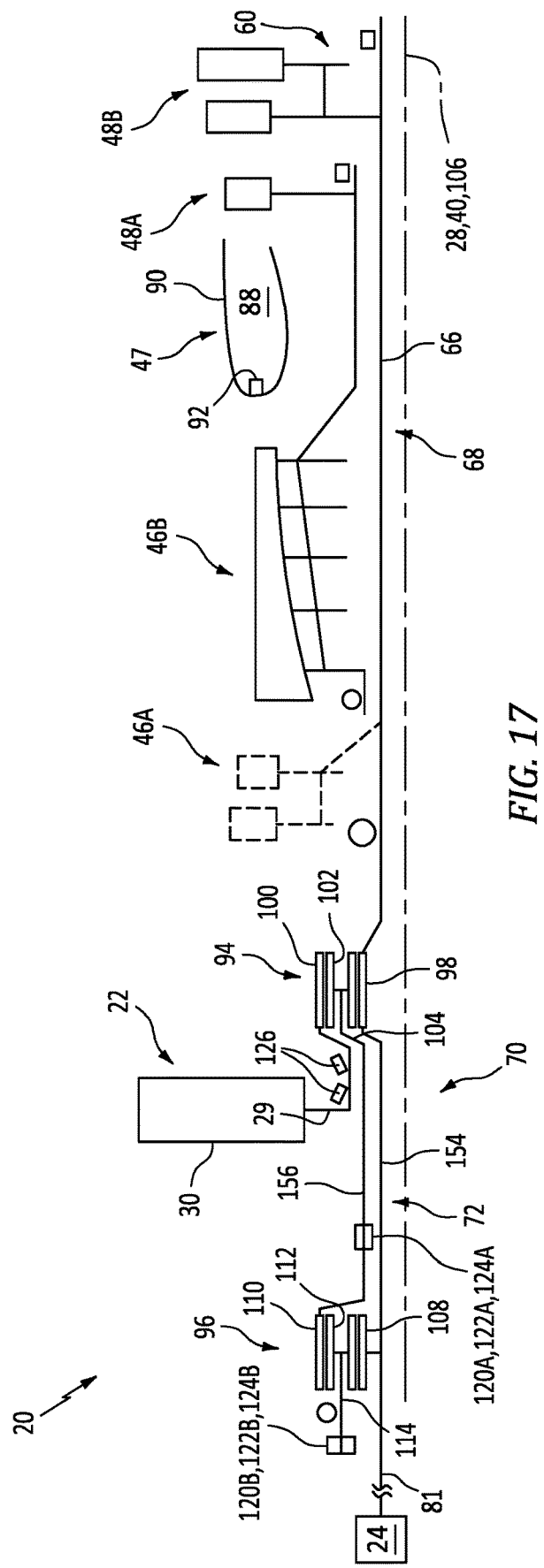
FIG. 17 is a schematic illustration of the aircraft propulsion system of FIG. 2 shown with still another geartrain arrangement.

In the embodiment of FIG. 11, the second propulsor rotor 24 (see FIG. 1) is coupled to and driven by the second carrier 114. In other embodiments, referring to FIG. 17, the second propulsor rotor 24 (see FIG. 1) may be coupled to and driven by the second sun gear 114. However, the remainder of the first and second gear systems 72 and 96 may (or may not) be configured as described above with respect to FIG. 11. With such an arrangement, the second propulsor rotor 24 may rotate in a common speed and direction with the low speed rotating structure 68. Here, the transmission 76 of FIG. 1 may decouple the second propulsor rotor 24 from the low speed rotating structure 68 during the first mode of operation; e.g., while the second propulsor rotor 24 is stationary or windmilling.

Figure 15:
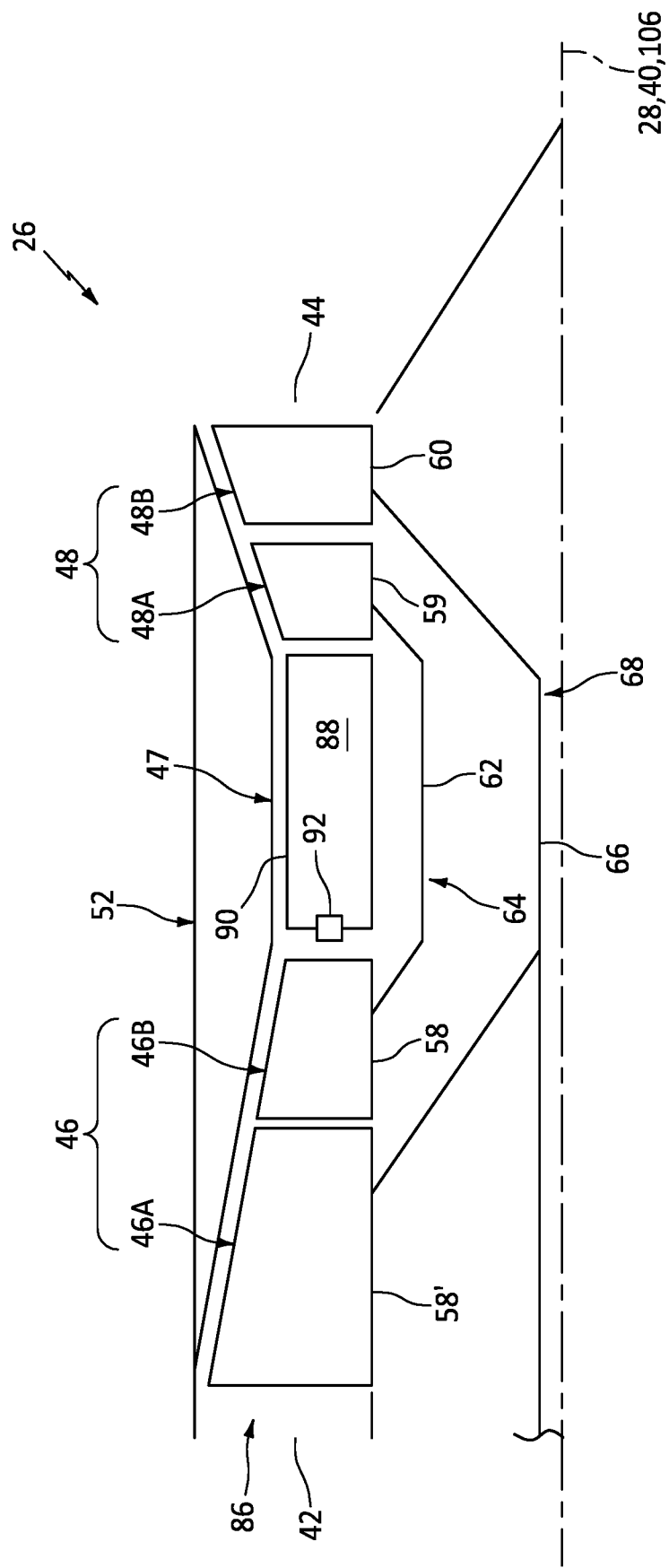
FIG. 15 is a partial, schematic illustration of a gas turbine engine core.

In some embodiments, referring to FIG. 1, the low speed rotating structure 68 may be configured without a compressor rotor. In other embodiments, referring to FIG. 15, the low speed rotating structure 68 may include a low pressure compressor (LPC) rotor 58' arranged within a low pressure compressor (LPC) section 46A of the compressor section 46. In such embodiments, the compressor rotor 58 may be a high pressure compressor (HPC) rotor within a high pressure compressor (HPC) section 46B of the compressor section 46.

Figure 16:
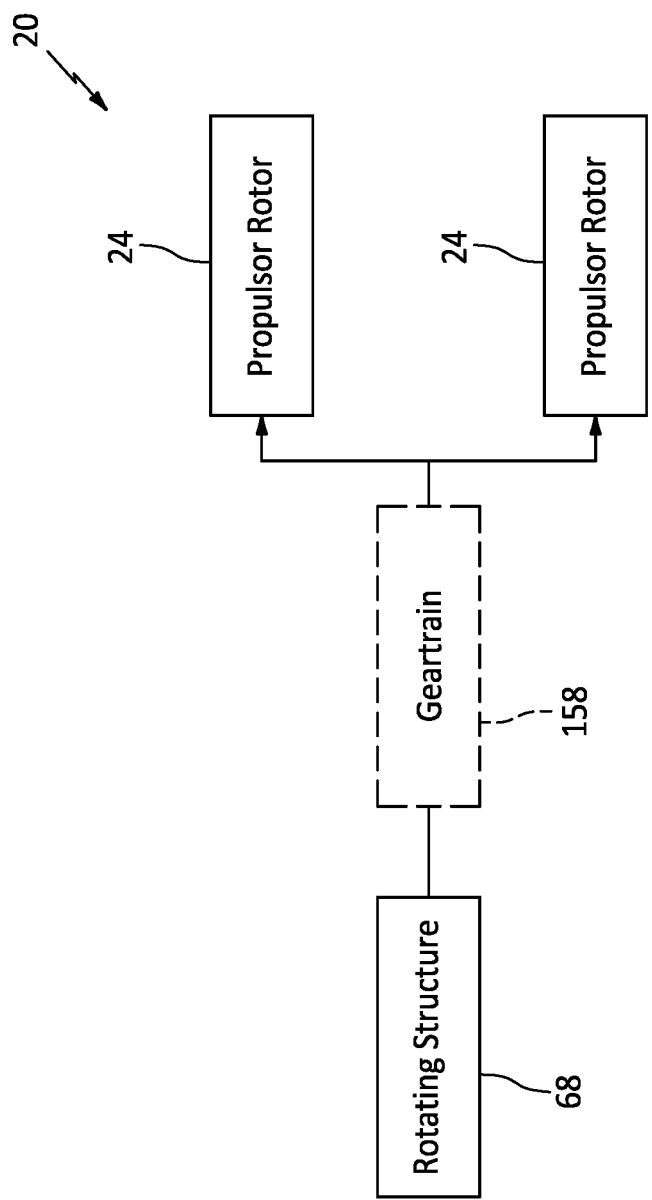
FIG. 16 is a partial, schematic illustration of a rotating structure coupled to and driving multiple propulsor rotors for generating propulsive lift.

The engine core 26 (e.g., see FIG. 1) may have various configurations other than those described above. The engine core 26, for example, may be configured with a single spool, with two spools (e.g., see FIG. 1), or with more than two spools. The engine core 26 may be configured with one or more axial flow compressor sections, one or more radial flow compressor sections, one or more axial flow turbine sections and/or one or more radial flow turbine sections. The engine core 26 may be configured with any type or configuration of annular, tubular (e.g., CAN), axial flow and/or reverser flow combustor. The present disclosure therefore is not limited to any particular types or configurations of gas turbine engine cores. Furthermore, it is contemplated the engine core 26 of the present disclosure may drive more than the two propulsor rotors 22 and 24, or a single one of the propulsor rotors 22 and 24 and/or one or more other mechanical loads; e.g., electric machines, electric generators, electric motors, etc. The aircraft propulsion system 20, for example, may include two or more of the first propulsor rotors 22 and/or two or more of the second propulsor rotors 24. For example, the aircraft propulsion system 20 of FIG. 16 includes multiple second propulsor rotors 24 rotatably driven by the low speed rotating structure 68. These second propulsor rotors 24 may rotate about a common axis. Alternatively, each second propulsor rotor 24 may rotate about a discrete axis where, for example, the second propulsor rotors 24 are laterally spaced from one another and coupled to the low speed rotating structure 68 through a power splitting geartrain 158.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aircraft, comprising:
a geartrain including a first gear system and a second gear system;
the first gear system including a first sun gear, a first ring gear, a plurality of first intermediate gears and a first carrier, the first sun gear and the first ring gear each rotatable about an axis, the plurality of first intermediate gears between and meshed with the first sun gear and the first ring gear, and each of the plurality of first intermediate gears rotatably mounted to the first carrier;
the second gear system interconnected with the first gear system, the second gear system including a second sun gear, a second ring gear, a plurality of second intermediate gears and a second carrier, the second sun gear rotatable about the axis and coupled to the first ring gear, the plurality of second intermediate gears between and meshed with the second sun gear and the second ring gear, and each of the plurality of second intermediate gears rotatably mounted to the second carrier;
a first propulsor rotor coupled to the first ring gear; and
a rotating structure coupled to the first sun gear and comprising a turbine rotor, the rotating structure configured to drive rotation of the first propulsor rotor through the geartrain.

2. The assembly of claim 1, wherein
the first carrier and the second carrier are each rotatable about the axis; and
the second carrier is coupled to the first carrier.

3. The assembly of claim 2, further comprising at least one of
a lock device configured to lock rotation of the first carrier and the second carrier about the axis; or
a brake configured to brake rotation of the first carrier and the second carrier about the axis.

4. The assembly of claim 1, wherein the second ring gear is rotatable about the axis.

5. The assembly of claim 4, further comprising at least one of
a lock device configured to lock rotation of the second ring gear about the axis; or
a brake configured to brake rotation of the second ring gear about the axis.

6. The assembly of claim 1, wherein the second carrier is rotatable about the axis.

7. The assembly of claim 6, further comprising at least one of
a lock device configured to lock rotation of the second carrier about the axis; or
a brake configured to brake rotation of the second carrier about the axis.

8. An assembly for an aircraft, comprising:
a geartrain including a first gear system and a second gear system;
the first gear system including a first sun gear, a first ring gear, a plurality of first intermediate gears and a first carrier, the first sun gear and the first ring gear each rotatable about an axis, the plurality of first intermediate gears between and meshed with the first sun gear and the first ring gear, and each of the plurality of first intermediate gears rotatably mounted to the first carrier;
the second gear system interconnected with the first gear system, the second gear system including a second sun gear, a second ring gear, a plurality of second intermediate gears and a second carrier, the plurality of second intermediate gears between and meshed with the second sun gear and the second ring gear, and each of the plurality of second intermediate gears rotatably mounted to the second carrier;
a first propulsor rotor coupled to the first ring gear, the first propulsor rotor configured to rotate about a first rotor axis;
a second propulsor rotor coupled to a component of the second gear system, the second propulsor rotor configured to rotate about a second rotor axis that is angularly offset from the first rotor axis; and
a rotating structure coupled to the first sun gear and comprising a turbine rotor, the rotating structure configured to drive rotation of the first propulsor rotor through the geartrain, and the rotating structure configured to drive rotation of the second propulsor rotor through the geartrain.

9. The assembly of claim 8, wherein the component of the second gear system comprises the second ring gear.

10. The assembly of claim 8, wherein the component of the second gear system comprises the second carrier.

11. The assembly of claim 8, wherein the component of the second gear system comprises the second sun gear.

12. An assembly, comprising:
a geartrain including a first gear system and a second gear system;
the first gear system including a first sun gear, a first ring gear, a plurality of first intermediate gears and a first carrier, the first sun gear and the first ring gear each rotatable about an axis, the plurality of first intermediate gears between and meshed with the first sun gear and the first ring gear, each of the plurality of first intermediate gears rotatably mounted to the first carrier, and the first carrier rotatable about the axis;
the second gear system interconnected with the first gear system, the second gear system including a second sun gear, a second ring gear, a plurality of second intermediate gears and a second carrier, the second sun gear coupled to the first ring gear, the second sun gear and the second ring gear each rotatable about the axis, the plurality of second intermediate gears between and meshed with the second sun gear and the second ring gear, each of the plurality of second intermediate gears rotatably mounted to the second carrier, and the second carrier rotatable about the axis;
a power output coupled to one of the first ring gear, the second ring gear or the second carrier;
a power input coupled to the first sun gear, the power input configured to drive rotation of the power output through the geartrain; and
a rotating structure coupled to the power input and comprising a turbine rotor, the rotating structure configured to drive rotation of the power output through the geartrain.

13. The assembly of claim 12, further comprising a propulsor rotor coupled to and configured to be rotatably driven by the power output.

14. The assembly of claim 12, wherein the power output is coupled to the first ring gear.

15. The assembly of claim 12, wherein the power output is coupled to the second ring gear.

16. The assembly of claim 12, wherein the power output is coupled to the second carrier.

17. An assembly, comprising:
- a geartrain including a first gear system and a second gear system;
- the first gear system including a first sun gear, a first ring gear, a plurality of first intermediate gears and a first carrier, the first sun gear and the first ring gear each rotatable about an axis, the plurality of first intermediate gears between and meshed with the first sun gear and the first ring gear, each of the plurality of first intermediate gears rotatably mounted to the first carrier, and the first carrier rotatable about the axis;
- the second gear system interconnected with the first gear system, the second gear system including a second sun gear, a second ring gear, a plurality of second intermediate gears and a second carrier, the second sun gear coupled to the first ring gear, the second sun gear and the second ring gear each rotatable about the axis, the plurality of second intermediate gears between and meshed with the second sun gear and the second ring gear, each of the plurality of second intermediate gears rotatably mounted to the second carrier, and the second carrier rotatable about the axis;
- a power output coupled to one of the first ring gear, the second ring gear or the second carrier; and
- a power input coupled to the first sun gear, the power input configured to drive rotation of the power output through the geartrain wherein the second carrier is coupled to the first carrier.

\* \* \* \* \*